United States Patent
Richardson

(10) Patent No.: US 12,429,215 B2
(45) Date of Patent: Sep. 30, 2025

(54) BURNER WITH A MOVEABLE AIR FLOW DIVERTER

(71) Applicant: Messer Industries USA, Inc., Bridgewater, NJ (US)

(72) Inventor: Andrew Richardson, Clinton, NJ (US)

(73) Assignee: Messer Industries USA, Inc., Delaware (DE)

( * ) Notice: Subject to any disclaimer, the term of this patent is extended or adjusted under 35 U.S.C. 154(b) by 8 days.

(21) Appl. No.: 16/917,944

(22) Filed: Jul. 1, 2020

(65) Prior Publication Data
US 2022/0003407 A1   Jan. 6, 2022

(51) Int. Cl.
| | |
|---|---|
| *F23C 9/00* | (2006.01) |
| *F23D 1/00* | (2006.01) |
| *F23D 11/02* | (2006.01) |
| *F23D 14/22* | (2006.01) |
| *F23D 17/00* | (2006.01) |
| *F23L 7/00* | (2006.01) |

(52) U.S. Cl.
CPC ............... *F23C 9/006* (2013.01); *F23D 1/00* (2013.01); *F23D 11/02* (2013.01); *F23D 14/22* (2013.01); *F23D 17/005* (2013.01); *F23L 7/007* (2013.01); *F23C 2202/40* (2013.01); *F23C 2900/06041* (2013.01); *F23C 2900/07021* (2013.01); *F23C 2900/09002* (2013.01); *F23C 2900/99001* (2013.01); *F23D 2209/20* (2013.01); *F23D 2900/00006* (2013.01)

(58) Field of Classification Search
CPC .......... F23D 14/48; F23D 14/25; F23D 14/22; F23D 14/32; F23D 14/02; F23D 14/20; F23D 2201/10; F23D 2900/111402; F23D 2900/00006; F23D 2900/00003; F23D 2900/07005; F23D 2900/07006; F23D 2900/20; F23D 11/12; F23C 2900/09002; F23C 2900/06041; F23C 7/00
See application file for complete search history.

(56) References Cited

U.S. PATENT DOCUMENTS

| | | | | |
|---|---|---|---|---|
| 1,412,023 A | * | 4/1922 | Erickson | F23D 11/00 |
| | | | | 126/200 |
| 1,844,315 A | * | 2/1932 | Forney | F23D 17/00 |
| | | | | 431/186 |
| 1,884,894 A | * | 10/1932 | Sherwood | F23D 11/00 |
| | | | | 431/175 |

(Continued)

FOREIGN PATENT DOCUMENTS

| | | | | |
|---|---|---|---|---|
| GB | 1537037 A | * | 12/1978 | ............. F23D 14/22 |
| GB | 2442331 A | * | 4/2008 | ................ F02C 3/30 |
| WO | WO-2006078543 A2 | * | 7/2006 | ............. F23C 6/045 |

*Primary Examiner* — Edelmira Bosques
*Assistant Examiner* — Michael James Giordano
(74) *Attorney, Agent, or Firm* — Joshua L. Cohen

(57) ABSTRACT

A burner includes an oxidant feed passage, a fuel feed passage surrounding the oxidant feed passage, an air feed surrounding the fuel feed passage, a movable air flow diverter and, optionally, a flame nozzle. The movable air flow diverter and/or flame nozzle are independently configured to create one or a plurality of gas recirculation regions adjacent the downstream tip of the burner to improve the mixing and reaction of the fuel and oxidant, and overall combustion process efficiency. A related furnace and method for generating a stable flame with the burner are also provided.

13 Claims, 11 Drawing Sheets

(56) References Cited

U.S. PATENT DOCUMENTS

| | | | | |
|---|---|---|---|---|
| 1,938,335 A * | 12/1933 | Hubbard | F23D 17/00 | 431/174 |
| 2,122,688 A * | 7/1938 | Hill | F23D 11/00 | 431/356 |
| 3,834,864 A * | 9/1974 | Jakobi | C21B 9/00 | 431/174 |
| 4,602,571 A * | 7/1986 | Chadshay | F23D 1/005 | 239/417 |
| 4,622,007 A * | 11/1986 | Gitman | F23G 5/50 | 431/351 |
| 4,797,087 A * | 1/1989 | Gitman | B05B 7/0861 | 239/423 |
| 5,156,100 A * | 10/1992 | Pentti | F23Q 13/00 | 110/263 |
| 5,611,683 A * | 3/1997 | Baukal, Jr. | F23D 14/32 | 239/422 |
| 5,743,723 A * | 4/1998 | Latrides | F23D 1/00 | 431/12 |
| 5,871,343 A * | 2/1999 | Baukal, Jr. | F23D 14/22 | 239/422 |
| 5,904,475 A * | 5/1999 | Ding | F23D 14/32 | 431/187 |
| 6,488,496 B1 * | 12/2002 | Feese | F23D 14/36 | 431/115 |
| 6,752,620 B2 * | 6/2004 | Heier | F23C 6/047 | 431/9 |
| 7,225,746 B2 * | 6/2007 | Kobayashi | F23D 1/02 | 110/348 |
| 7,520,134 B2 * | 4/2009 | Durbin | F23L 7/005 | 60/742 |
| 8,696,348 B2 * | 4/2014 | Cao | F23C 6/047 | 431/353 |
| 10,845,052 B1 * | 11/2020 | Van Otten | F23L 7/007 | |
| 11,092,333 B2 * | 8/2021 | Schreiner | F23C 6/045 | |
| 2006/0000395 A1 * | 1/2006 | Joshi | F23D 14/583 | 110/267 |
| 2016/0298839 A1 * | 10/2016 | Ekman | F23C 5/06 | |
| 2017/0276344 A1 * | 9/2017 | Schreiner | F23L 7/007 | |
| 2018/0142887 A1 * | 5/2018 | Kiyama | F23D 1/005 | |
| 2018/0313536 A1 * | 11/2018 | Boyle | F23D 14/32 | |

* cited by examiner

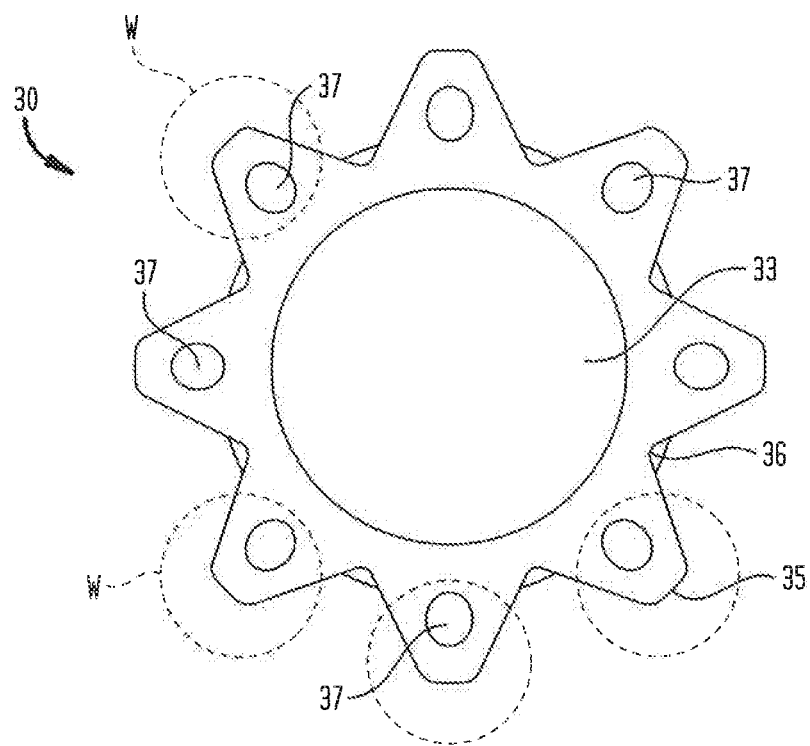
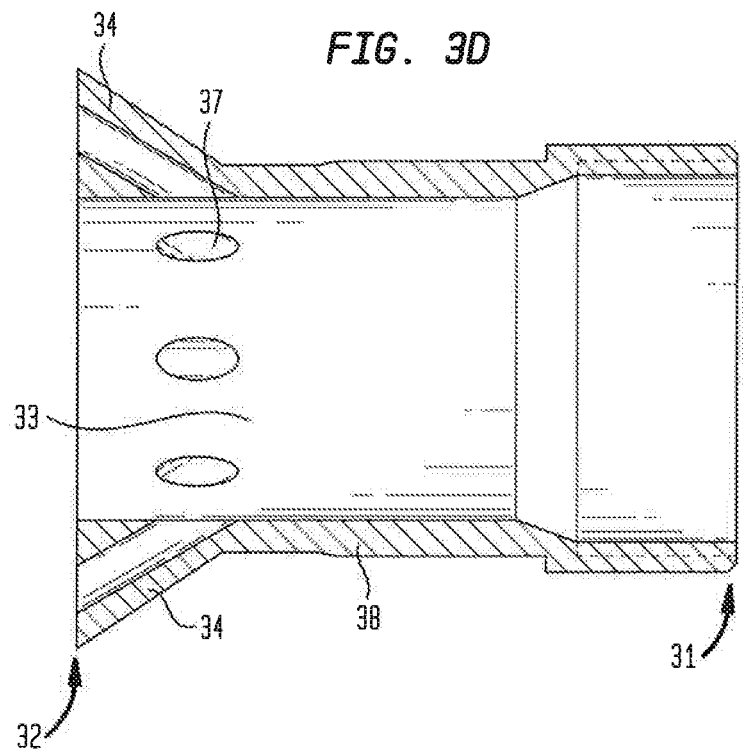

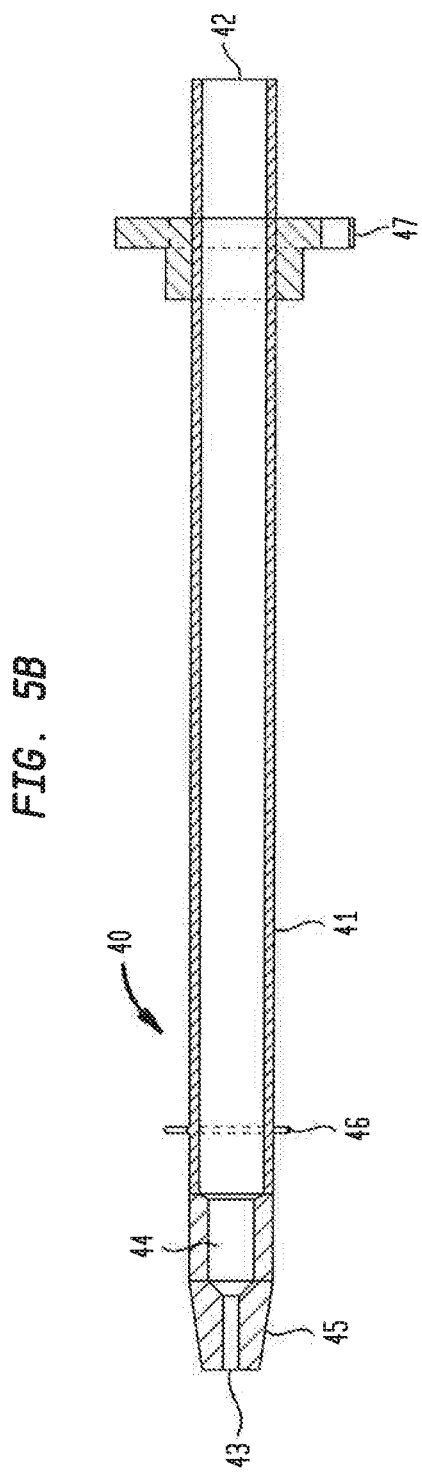

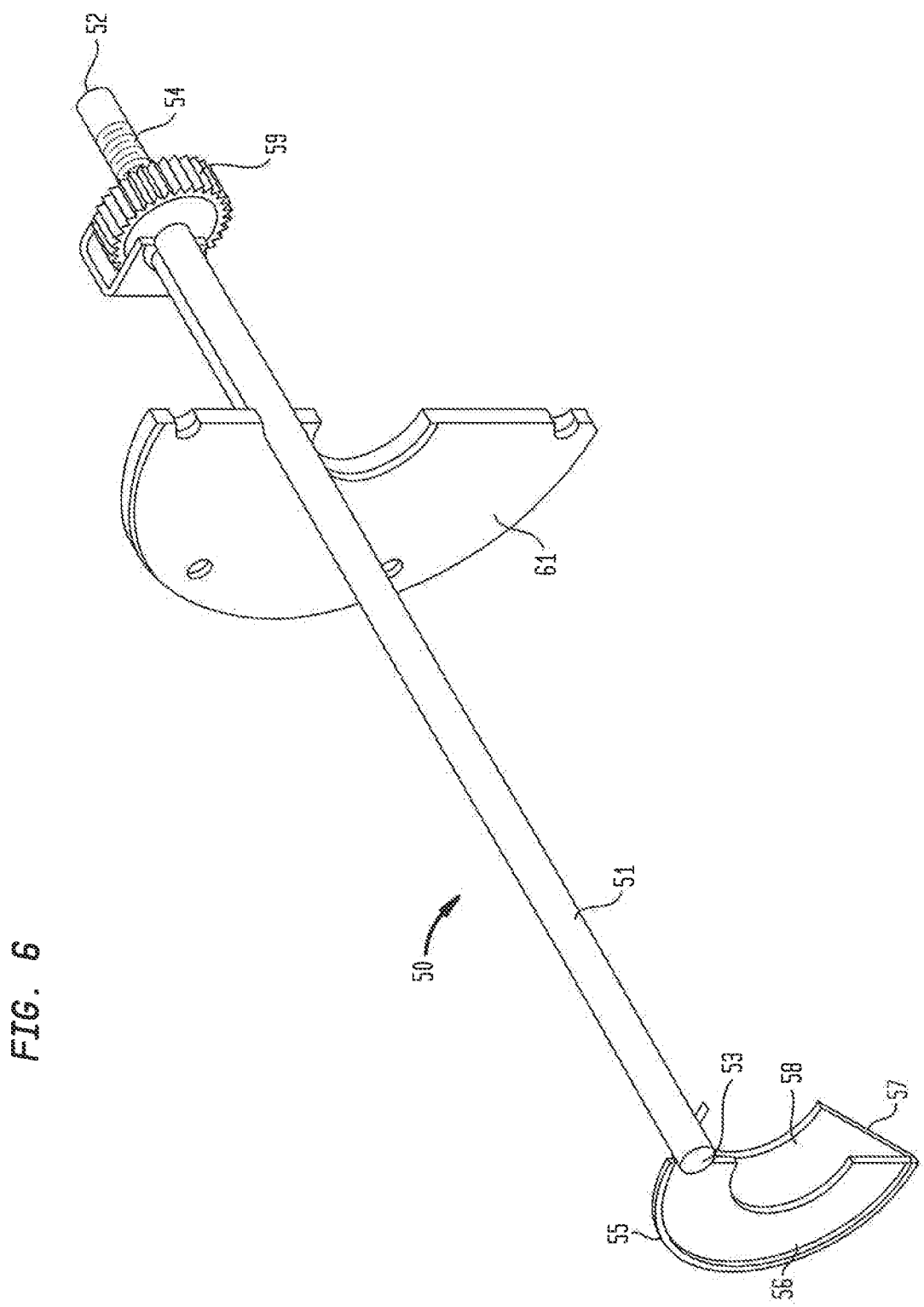

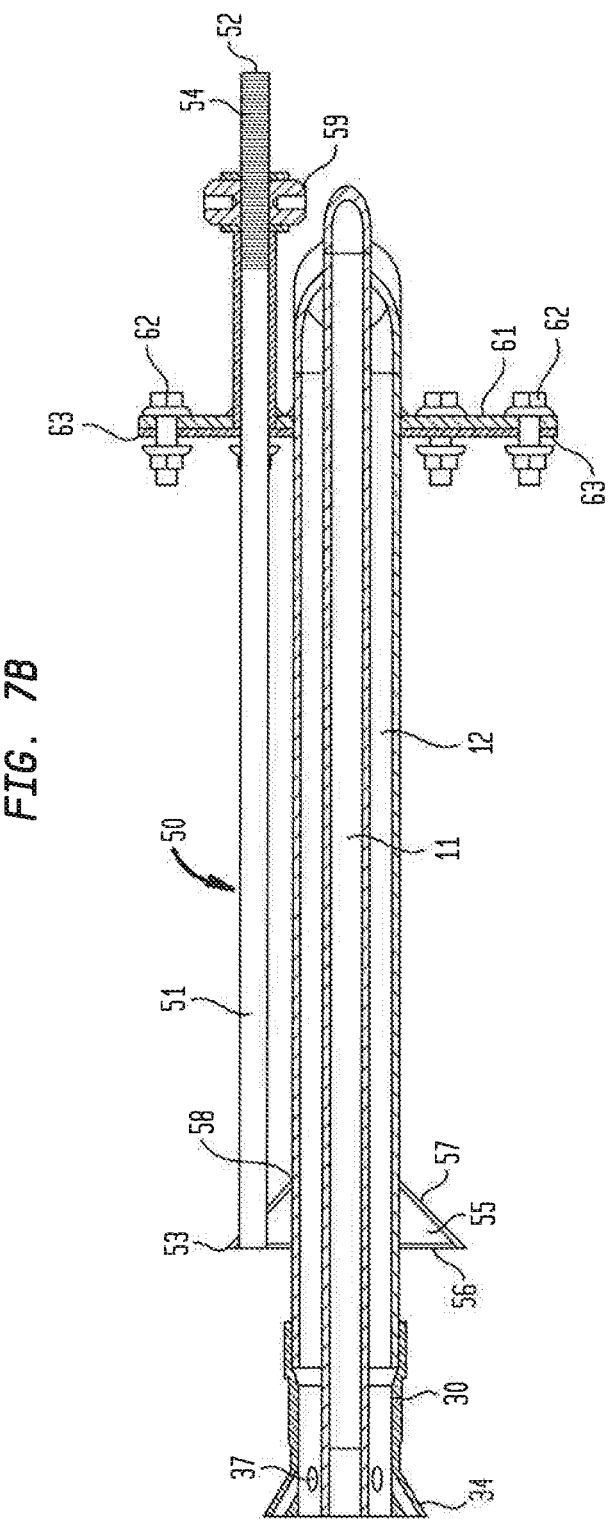

BURNER WITH A MOVEABLE AIR FLOW DIVERTER

TECHNICAL FIELD

The present disclosure relates to a burner and a furnace including the burner. The present disclosure further relates to a method of generating a flame by the combustion of a fuel by the burner.

BACKGROUND

Burners for the combustion of fuels may be categorized by the oxidant used in the combustion process as air-fuel burners (i.e., using air only as the oxidant), oxy-fuel burners (i.e., using oxygen only as the oxidant), or oxygen-enhanced or air-oxy-fuel, wherein the oxidant for the combustion process is delivered as a combination of air and pure oxygen.

The addition of pure oxygen to the combustion process in oxy-fuel and air-oxy-fuel burners offers advantages over air-fuel combustion resulting from the reduction in the volume of the products of combustion and waste heat, and an increase in flame temperature, heat transfer and production rates. The reduction in the volume of the products of combustion and waste heat leads to improved thermal efficiencies.

In combustion processes NOx may be formed by a number of mechanisms: Prompt, thermal, and in cases with chemically bound nitrogen to the fuel molecule, Fuel-NOx. With the combustion of typical clean gaseous or liquid fuels there is no Fuel-NOx and the majority of NOx is formed by the thermal NOx process at elevated temperature. As thermal NOx is driven by the availability of free oxygen, nitrogen and associated radicals at elevated temperatures, reducing the temperature and reducing the interaction of oxygen and nitrogen at elevated temperatures reduces the amount of NOx formed.

A typical approach is to 'stage' the combustion so the fuel partially reacts with the oxygen in a fuel rich environment and subsequently burns out with the addition of a supplemental or secondary oxidant supply. According to this strategy, substantial portions of the fuel-oxygen reaction occur in a fuel rich (i.e., low oxygen) environment, the flame is elongated (by the delayed reaction), and heat is radiated from the flame prior to the final oxidation resulting in lower peak flame temperatures and lower NOx formation rates. Further reductions in NOx emissions may be achieved through flameless combustion where the fuel and oxidant are introduced separately so as to entrain hot combustion products prior to their mixing and reaction. As the reactants have now been diluted and are hot, they react in a diffuse or flameless manner with significantly lower peak temperatures and thus NOx levels, than would occur in conventional flames. The utilization of flameless combustion further offers the advantage of a more uniform temperature distribution and the reduction in localized hot spots and localized overheating. The reduction in local temperature excursions typically permits the furnace to be operated at a higher overall temperature and thus at higher production rates.

The addition of pure oxygen to the combustion process does come with certain challenges in the control of NOx emissions. As the addition of oxygen is known to increase the flame temperature, the tendency to enhance the formation of thermal NOx is increased as air is gradually replaced with a greater proportion of oxygen. This increase in NOx continues until high oxygen concentrations are reached, at which point the availability of nitrogen decreases sufficiently and reduces the amount of NOx formed. Thus, it is possible for an air-oxy-fuel burner to produce increased levels of NOx beyond acceptable levels between the air-fuel and oxy-fuel limits even with staging technologies.

During holding periods or periods of low demand, for example, during charging or process interruptions, there is little need for high thermal inputs and, as such, the justification for using oxygen is reduced. Furthermore, in a cyclical heating process there are times during heat up that the temperature in the furnace may not be appropriately high (typically a minimum of 1400° F.) for safe flameless combustion and so a traditional separate flame is required.

What is therefore needed in the art is a flexible burner that can operate across a range of air-oxygen mixtures from pure air to pure oxygen with a stable flame mode for cold conditions, and in a flameless mode at higher temperatures to control NOx emissions with uniform heating and high production rates.

SUMMARY

According to certain illustrative embodiments, disclosed is a burner comprising an oxidant feed passage; a fuel feed passage surrounding the oxidant feed passage; an air feed surrounding the fuel feed passage; and a movable air flow diverter at least partially surrounding the fuel feed passage.

According to certain illustrative embodiments, disclosed is a burner comprising an oxidant feed passage; a fuel feed passage surrounding the oxidant feed passage; an air feed surrounding the fuel feed passage; a movable air flow diverter at least partially surrounding the fuel feed passage; and a flame nozzle configured to create a gas recirculation region downstream from the flame nozzle between the fuel feed passage and the air feed. The burner may be removable mountable to a wall of the furnace.

According to certain illustrative embodiments, disclosed is a furnace comprising a housing having an interior and at least one burner engaged with the housing and in fluid communication with the interior of the housing, wherein burner comprises an oxidant feed passage; a fuel feed passage surrounding the oxidant feed passage; an air feed surrounding the fuel feed passage; a movable air flow diverter at least partially surrounding the fuel feed passage; and optionally a flame nozzle configured to create a gas recirculation region downstream the flame nozzle between the fuel feed passage and the gas annulus.

According to further illustrative embodiments, also disclosed is a method for generating a flame by combustion of a fuel, the method comprising moving an oxidant feed through an oxidant feed passage; moving a fuel feed through a fuel feed passage surrounding the oxidant feed passage; moving air containing oxidant within an air feed region surrounding the fuel feed passage along the fuel feed passage; creating a gas recirculation region immediately downstream from the air feed and fuel feed passage; diverting the air feed for proportioning the air feed around the fuel feed passage for controlling flame stabilization in the gas circulation region; and igniting the gas mixture.

BRIEF DESCRIPTION OF DRAWINGS

The accompanying illustrative drawings are included to provide a further understanding of the apparatus and method disclosed herein and are incorporated in and constitute a part of this specification. The drawings illustrate certain embodiments of the apparatus and method disclosed herein and, together with the description, serve to explain the principles described herein, but are not intended to limit the specification or any of the claims in any manner.

FIG. 3C is an end view along 3C-3C in the illustrative embodiment of the flame nozzle shown in FIG. 3A.

FIG. 3D is a side view in cross-section of the illustrative embodiment of the flame nozzle shown in FIG. 3A.

FIG. 5B is a side view in cross-section of the oxidant injector of FIG. 5A.

FIG. 6 is a perspective view of an illustrative embodiment of the movable air flow diverter assembly.

FIG. 7B is a side view in cross-section of the assembly shown in FIG. 7A.

DETAILED DESCRIPTION

Figure 1:
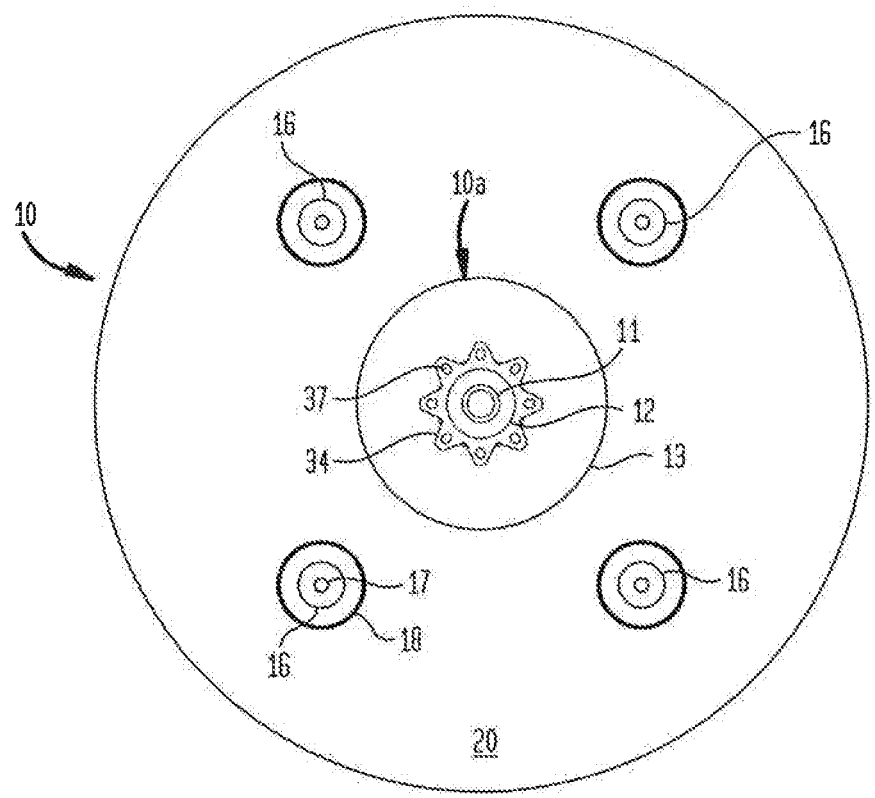
FIG. 1 is a cross-sectional view of an illustrative embodiment of the disclosed burner.

The present disclosure is directed to a burner that is configured to operate across a wide range of oxidants from air to pure oxygen, and with any proportion of air and oxygen in both a flame and flameless mode while generating low NOx emissions.

The disclosed burner comprises an oxidant feed passage, a fuel feed passage at least partially surrounding the oxidant feed passage, an air feed or air flow in a region that at least partially surrounding the fuel feed passage, and a movable air flow diverter at least partially surrounding the fuel feed passage. The air feed may comprise an air annulus that surrounds the outer surface of the fuel feed passage. The air annulus may be present along the entire length of the fuel feed passage.

According to certain illustrative embodiments, the disclosed burner comprises a oxidant feed passage, a fuel feed passage at least partially surrounding the oxidant feed passage, an air feed or air flow at least partially surrounding the fuel feed passage, a movable air flow diverter at least partially surrounding the fuel feed passage, and a flame nozzle configured to create a gas recirculation region at the flame nozzle between the fuel feed passage and the air feed. The air feed may comprise an air annulus that surrounds the outer surface of the fuel feed passage. The air annulus may be present along the entire length of the fuel feed passage.

The oxidant feed passage of the disclosed burner is configured for moving an oxidant feed or stream of oxidant within the oxidant feed passage from a first location to a second location. According to certain embodiments, the oxidant feed passage comprises an elongated conduit, pipe, or tube having opposite first and second ends and a longitudinal axis extending between the first and second ends of the passage. The first end of the elongated oxidant feed passage is an oxidant inlet where gaseous oxidant enters into the elongated oxidant feed passage. The second end of the elongated oxidant feed passage is an oxidant discharge or outlet end where the gaseous oxidant exits the oxidant feed passage. During use of the burner, the oxidant is supplied to the oxidant feed passage at the oxidant inlet located at the first end of the elongated oxidant feed passage and the gaseous oxidant is moved within the elongated oxidant feed passage until it reaches the second end of the oxidant fee passage where it is discharged.

According to certain embodiments, the fuel feed passage comprises an elongated conduit, pipe, or tube having opposite first and second ends. The first end of the elongated fuel feed passage is a fuel inlet where a suitable fuel enters into the elongated fuel feed passage. The second end of the elongated fuel feed passage is a fuel discharge or outlet end where the fuel exits the fuel feed passage. During use of the burner, a suitable fuel is supplied to the fuel feed passage at the fuel inlet located at the first end of the elongated fuel feed passage and the fuel is moved within the elongated fuel feed passage until it reaches the second end of the fuel fee passage where it is discharged for reaction with the oxidant.

The air feed or air flow at least partially surrounds the outer surface of the elongated fuel feed passage. During use, an air feed is flowed over the outer surface of the elongated fuel passage along at least a portion of the length of the fuel feed passage in the direction of the fuel discharge end of the fuel feed passage. According to certain embodiments, an air feed is flowed along the outer surface of the elongated fuel passage from the fuel input end to the fuel discharge end of the fuel feed passage. According to certain embodiments, the air feed is contained within a region, such as an air annulus, surrounding the outer surface of the fuel feed passage. According to certain embodiments, the air is flowed over the outer surface of the fuel feed passage within an annulus and converges with the fuel at or immediately downstream from the discharge end of the fuel fee passage.

The burner further includes a movable air flow diverter that is positioned about the outer surface of the fuel feed passage and at least partially surrounds the fuel feed passage. According to certain embodiments, the movable air flow diverter is coaxially positioned about the outer surface of the fuel feed passage and surrounds a portion of outer surface of the fuel feed passage. According to certain embodiments, the air flow diverter is positionable by being movable in a back-and-forth direction along at least a portion of the longitudinal axis of the fuel feed passage.

The movable air diverter is moved along at least one portion of the longitudinal axis of the fuel feed passage with means for moving the movable air diverter. According to certain embodiments, the means for moving the movable air diverter includes a threaded rod and a rotatable screw assembly. The elongated rod of the assembly is spaced part from the outer surface of the fuel feed passage and is positioned in parallel manner relative to the elongated fuel feed passage. The elongated rod includes opposite first and second ends. A portion of an outer surface of a length of the elongated rod is externally threaded inwardly from the first end. An internally threaded and rotatable screw is threaded over the external threads of the elongated rod near the first end of the rod to provide the screw-rod assembly. The air flow diverter is connected at or near the second end of the elongated rod member.

The movable air flow diverter translates back-and-forth along the longitudinal axis of the fuel feed passage by turning the screw in a clockwise or counterclockwise manner. As the air flow diverter is moved closer to the fuel discharge end of the fuel feed passage, the amount of air flow that reaches the central burner is decreased. As the air flow diverter is moved toward the fuel inlet end of the fuel feed passage, the amount of air flow that reaches the central burner is increased, and the amount of air that is supplied to surround the additional oxygen lances decreases. According to other embodiments of the moving means, a motor and automatic drive may be use as an alternative embodiment to the rotatable screw to control the movement of the movable air diverter, either remotely or by automatic operation.

According to certain illustrative embodiments, the movable air flow diverter includes a central opening for coaxially fitting the diverter over the outer surface of the fuel feed passage. According to certain illustrative embodiments, the movable air diverter may be configured in a frusto-conical shape having a central opening for coaxially fitting the diverter over the outer surface of the fuel feed passage. In embodiments in which the movable air diverter is configured in a frusto-conical shape, the base of the frusto-conical shape faces toward the fuel discharge end of the fuel feed passage, while the tapered, curved surface of the cone faces toward the fuel inlet end the fuel feed passage. The configuration of the air diverter in the frusto-conical shape is but one possible means for the air diverter. Any suitable structure capable of diverting the air passing along the outer surface of the fuel feed passage within the air annulus may be used as the air diverter. By way of illustration, and not limitation, the air flow diverter may comprise a blade or plate structure configured in a wide variety of shapes such as circle, diamond, elliptical, hexagon, octagon, oblong, oval, pentagon, rectangular, square, and the like.

The use of the movable air flow diverter eliminates the need to use additional more expensive fans, blowers, compressors and air flow control valves and meters to deliver the air supply to the burner and air flow control line(s). The use of the movable air diverter moves a proportion of the total air to the center of the burner, with the amount of air being delivered by adjusting the location of the air diverter. The air flow diverter may be moved forward to reduce the open area for air flow to the central burner member, thereby reducing the air flow to the center of the burner. Reducing the amount of air to the center of the burner allows for higher fuel richness of the center flame to the point of flameless operation. The use of the movable air flow diverter also results in diverting and distributing the air supply substantially evenly or evenly to the plurality of air passages in the burner block surrounding the additional peripheral oxidant injectors (i.e., the additional oxygen lances).

The disclosed burner optionally includes a flame nozzle or tip that is located at the fuel feed discharge end of the fuel feed passage. The flame nozzle is also commonly referred to in the art as a "flame holder." The flame nozzle may be formed integral with the discharge end of the fuel feed passage or may be a separate structure that is connected to the discharge end of the fuel feed passage. According to certain illustrative embodiments, the flame nozzle is a separate component that is attached to the discharge end of the fuel feed passage. A portion of the length of the fuel feed passage at or near the fuel discharge end is externally threaded, and the flame nozzle having a portion that is internally threaded is threaded onto the discharge end of the fuel feed passage. The flame nozzle may optionally be welded in place to prevent it from becoming loose through vibration and thermal cycling during operation.

The flame nozzle is configured to create a gas recirculation region between the gas streams from the air annulus surrounding the fuel feed passage and the gaseous fuel exiting the discharge end of the fuel feed passage. The gas recirculation region created by the flame nozzle is located at a position that is immediately downstream from the flame nozzle. The gas recirculation region creates a locally combustible mixture of fuel and air with typically a lower velocity than the fuel and air free stream velocities with a recirculation pattern that brings hot combustion products back towards the flame nozzle to reignite the air and fuel present in the region, thereby resulting in a local flame that stabilises the combustion between the air and fuel free streams.

According to certain embodiments, the flame nozzle wall may profile inwardly and/or outwardly into the fuel stream itself and the air stream. This results in a flame nozzle tip with a cross section that is wider than the cross-section wall of the fuel feed passage.

According to other embodiments, the inner and/or outer walls of the flame nozzle may be corrugated to increase the perimeter of the inside and outside edges of the flame nozzle. The plurality of corrugations on the flame nozzle are configured to create a gas recirculation region.

According to other embodiments, the flame nozzle may include one or a plurality of separate passages connecting the fuel stream exiting the fuel feed passage with the air stream from the air annulus surrounding the fuel feed passage to create the gas recirculation region immediately downstream from the flame nozzle. The passage(s) are formed in the wall of the flame nozzle and communicate from the interior of flame nozzle to outside of the flame nozzle at a location immediately downstream from the flame nozzle. According to certain embodiments, the one or the plurality of the separate passages provide communication from the interior of the flame nozzle to the vertical discharge face of the nozzle to deliver fuel feed into the recirculation region. According to certain embodiments, each one of the separate openings communicate from the interior of the flame nozzle and exit through the face of a corrugation formed on the tip of the nozzle to deliver fuel feed into the recirculation region.

According to certain embodiments, the burner further includes a plurality of oxidant injectors positioned about the central burner member, e.g. about a periphery of the burner. The central burner member introduces the gaseous fuel stream and a portion of the oxidant stream to form a fuel rich central stream. The plurality of peripheral oxidant injectors surrounding the central burner member introduce the balance of the oxidant at high velocity for final combustion of the fuel rich central stream. The central fuel rich stream and high velocity peripheral oxidant streams cause a high degree of penetration into the furnace atmosphere and a high degree of recirculation and mixing of the hot furnace combustion products into the fuel rich and peripheral oxidant streams. Such mixing dilutes the central and peripheral streams with hot combustion products causing a more diffuse combustion reaction, which reduces peak temperatures and reduces NOx.

According to certain embodiments, two flames may form on the burner with one flame being formed between the inner oxidant stream and the annular fuel stream, and another flame being formed between the annular fuel stream and the outer annular air flow. Since the reaction rates between pure oxygen and natural gas are faster than between air and natural gas, there is little difficulty in stabilizing a flame between these two streams and as such a flame stabilizer between the oxidant feed gas and natural gas fuel streams may not be required.

According to certain embodiments, when the burner is operating in modes with both air and oxygen flowing, both flames (i.e., the air-natural gas and the oxygen-natural gas) will be present, whereas at the extremes of operation (i.e., pure air or pure oxygen only) either the air-natural gas or the oxygen-natural gas flame will be present. Supplying the natural gas through the annular passage ensures that both the member separating the inner oxidant and annular natural gas, and the member separating the outer annular air and the annular natural gas are cooled at all times by the natural gas as long as the burner is firing.

According to certain embodiments, the central burner portion is capable of producing an oxygen jet stream having a velocity of <120 m/s (at max flow), an annular gaseous fuel jet stream having a velocity of <50 m/s surrounding the oxygen jet, and an annular air jet stream having a velocity of <50 m/s surrounding the gaseous fuel jet stream.

The oxidant supply to the burner may be through separate oxidant supply lines or by an internal or external manifold. According to certain embodiments, the oxidant may be supplied to the oxidant feed passage of the central burner and to the additional oxidant injectors positioned about the central burner by a manifold, such as a high-pressure manifold. The distribution of oxidant between the additional oxidant injectors may be controlled by the areas of the sonic discharge nozzles, and the portion of oxidant delivered to the center burner by a similar flow limiting orifice in the oxidant supply line to the center burner oxidant feed passage. Such a center burner flow limiting nozzle may be fixed in area or may be variable as in a control valve. An isolation or shut off valve may also be placed in the oxidant supply line to the center burner oxidant feed passage to facilitate the switch between flame and flameless operation. The isolation valve may be manually or automatically actuated by a solenoid or pneumatic actuator. A bypass line around the isolation valve may be included to allow a small bleed flow of oxidant to the center burner oxidant feed passage to maintain nozzle cleanliness.

The air supply to the additional peripheral oxidant injectors positioned around the central burner may be delivered by a manifold or plenum arrangement. The manifold or plenum arrangement may be constructed externally or internally to the burner block. According to certain embodiments, the air supply delivered to the peripheral oxidant injectors is by a plenum arrangement formed internally within the burner block.

According to certain illustrative embodiments, disclosed is a furnace comprising a housing having an interior and at least one burner engaged with the housing and in fluid communication with the interior of the housing, wherein the burner comprises an oxidant feed passage, a fuel feed passage surrounding the oxidant feed passage, an air feed or air flow surrounding the fuel feed passage, a movable air flow diverter at least partially surrounding the fuel feed passage, and optionally a flame nozzle configured to create a gas recirculation region at or immediately downstream the flame nozzle between the fuel feed passage and the gas annulus.

The burner may also include a refractory ring or sleeve member that is positioned to surround the flame nozzle of the center burner member of the burner. The inner surface of the refractory sleeve is spaced apart from the flame nozzle to create or otherwise provide an air space between the flame nozzle and the sleeve. The refractory sleeve controls the velocity and mixing of the fuel and oxidant around the center burner flame nozzle and flame shape. The ability to interchange the refractory sleeve allows a further degree of control of the air flow velocity and configuration, thus allowing further control over the mixing and reaction of fuel and air and thus flame development.

According to certain embodiments, the refractory sleeve may be a cylindrical ring of solid refractory material having an inner surface, an outer surface and a thickness extending between the inner and outer surfaces. The refractory sleeve further includes opposite facing first and second faces that are coextensive with the thickness of the sleeve extending between the inner and outer surfaces.

According to certain embodiments, the refractory sleeve may be a cylindrical ring of refractory material having an inner surface, an outer surface, a thickness extending between the inner and outer surfaces, opposite facing first and second faces that are coextensive with the thickness of the sleeve extending between the inner and outer surfaces, and at least one elongated air passage extending through the sleeve from the first face to the second face of the sleeve. According to certain embodiments, the refractory sleeve includes a plurality of air passages extending through the sleeve from the first to the second face. According to certain embodiments, the plurality of air passages are evenly spaced apart around the refractory sleeve. The at least one air passage(s) create regions of greater mixing and reaction downstream from the sleeve with the recirculation region and flame now being formed in the regions between the annular fuel jet stream and the discharge holes of the refractory sleeve.

According to further illustrative embodiments, also disclosed is a method of generating a flame by the combustion of a fuel. The method comprises moving an oxidant feed through an oxidant feed passage, moving a fuel feed through a fuel feed passage surrounding the oxidant feed passage, moving air containing oxidant within an air feed region surrounding the fuel feed passage along the fuel feed passage, converging the gas from the air feed and the fuel feed to create at least one gas recirculation region immediately downstream from the air feed and fuel feed passage, or converging the oxidant feed and fuel feed to create at least one gas recirculation region immediately downstream from the fuel feed passage and oxidant passage and igniting the gas mixture.

The presently disclosed burner is suitable for the combustion of gaseous fuels, liquid fuels and solid fuels. According to illustrative embodiments of the burner and method which utilize a liquid fuel, the burner may further include means for atomizing the liquid fuel feed(s). Atomization of the fuel feed(s) enlarges the surface area of the fuel, which results in the accelerated and intensified reaction between the fuel and the oxidant.

The fuel feed may comprise a gaseous fuel selected from at least one of methane, natural gas, liquefied natural gas, propane, liquefied propane gas, butane, low BTU gases, town gas, producer gas, hydrogen, carbon monoxide, and mixtures thereof. The term "town gas" means the by-product of gasifying coal and/or oil. The term "producer gas" means the by-product of partial combustion of carbon substances such as for example coal in an atmosphere of air and steam.

The fuel feed may comprise an atomized liquid fuel selected from at least one of heavy fuel oil, medium fuel oil, light fuel oil, kerosene, diesel, and mixtures thereof.

The fuel feed may comprise a particulate solid fuel selected from at least one of coal, coke, petroleum coke, rubber, woodchips, sawdust, straw, biomass fuels, and mixtures thereof suspended in a carrier gas stream. The carrier gas stream may be selected from at least one of air, nitrogen, carbon dioxide, and a gaseous fuel; the gaseous fuel selected from at least one of methane, natural gas, liquefied natural gas, propane, liquefied propane gas, butane, low BTU gases, town gas, producer gas, hydrogen, carbon monoxide, and mixtures thereof.

Without limitation, and only by way of illustration, the disclosed nozzle and burner may be utilized in high temperature heating and melting processes, such as aluminium re-melting furnaces, steel reheating furnaces, glass melting furnaces and the like.

The disclosed burner is operable in either a flame mode at both high and low temperatures wherein the presence of a flame must be detected for safe operation, and in a flameless mode at high temperatures (>1400° F.).

The disclosed burner is capable of controlling NOx in the flame mode by altering the degree of high temperature visible combustion in the center portion of the burner.

The disclosed burner is capable of transitioning to flameless mode at high process temperatures to control the degree of NOx formation that is inherent at high process temperatures. The ability to utilize flameless combustion allows for more uniform heating and the avoidance of localized temperature excursions, thereby allowing higher firing rates or energy intensities for higher production rates.

The ability of the disclosed burner to operate at different air and oxygen participation levels enables the burner to use oxygen only when needed for the process or, more specifically, to use only an amount of oxygen needed for the process requirements.

The arrangement of the flame central burner ensures that in flameless mode or at the extremes of operation (i.e., pure air or pure oxygen) with a central flame, that the central burner tip components are cooled by gas flow.

Referring to the Figures, FIG. 1 shows an end view of an illustrative embodiment of the burner 10 of the present disclosure. Burner 10 includes a central burner member 10a comprising an oxidant feed passage, a fuel feed passage and an air flow passage. Burner 10 includes a centrally disposed oxidant feed passage 11. A fuel feed passage 12 surrounds the oxidant feed passage 11. An air flow annulus 13 surrounds the outer surface of the fuel feed passage 12. Burner 10 may further include a plurality of additional oxidant injectors 16 positioned about a periphery of the central burner member 10a. Each of the plurality of the peripheral oxidant injectors 16 includes an elongated lance body that provides a passage for flow of gaseous oxidant and which terminates in a supersonic oxygen discharge tip 17. An air flow annulus 18 surrounds the outer surface of the oxidant injector 16.

Still referring to FIG. 1, oxidant feed passage 11, fuel feed passage 12 and oxidant injectors 16 are positioned at least partially within a burner block 20 made of refractory material. The air flow annulus 13 that surrounds the fuel feed passage 12 is an air flow region defined by the outer surface of fuel feed passage 12 and an inner annular surface of burner block 20. The plurality of air flow annuli 18 that surround oxidant lance bodies 16 are air flow regions defined by the outer surface of the injectors 16 and inner annular surfaces of burner block 20.

Figure 2:
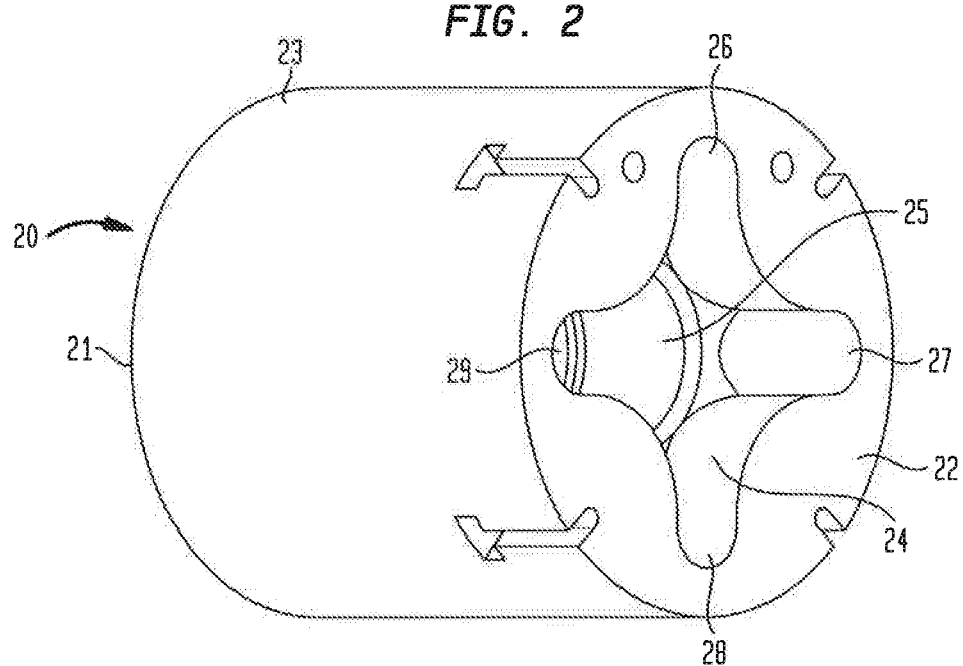
FIG. 2 is a rear perspective view of an illustrative embodiment of a burner block of refractory material.
Figure 3A:
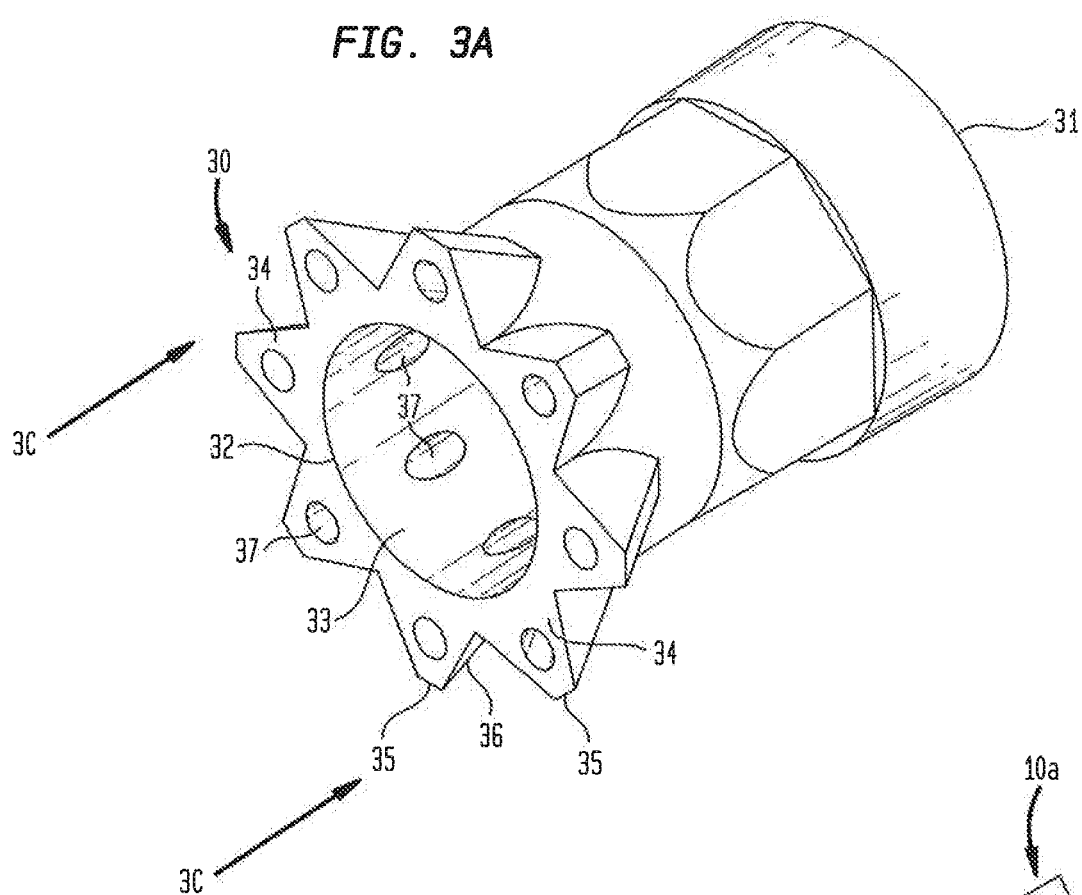
FIG. 3A is a perspective view of an illustrative embodiment of a flame nozzle of the burner.
Figure 3B:
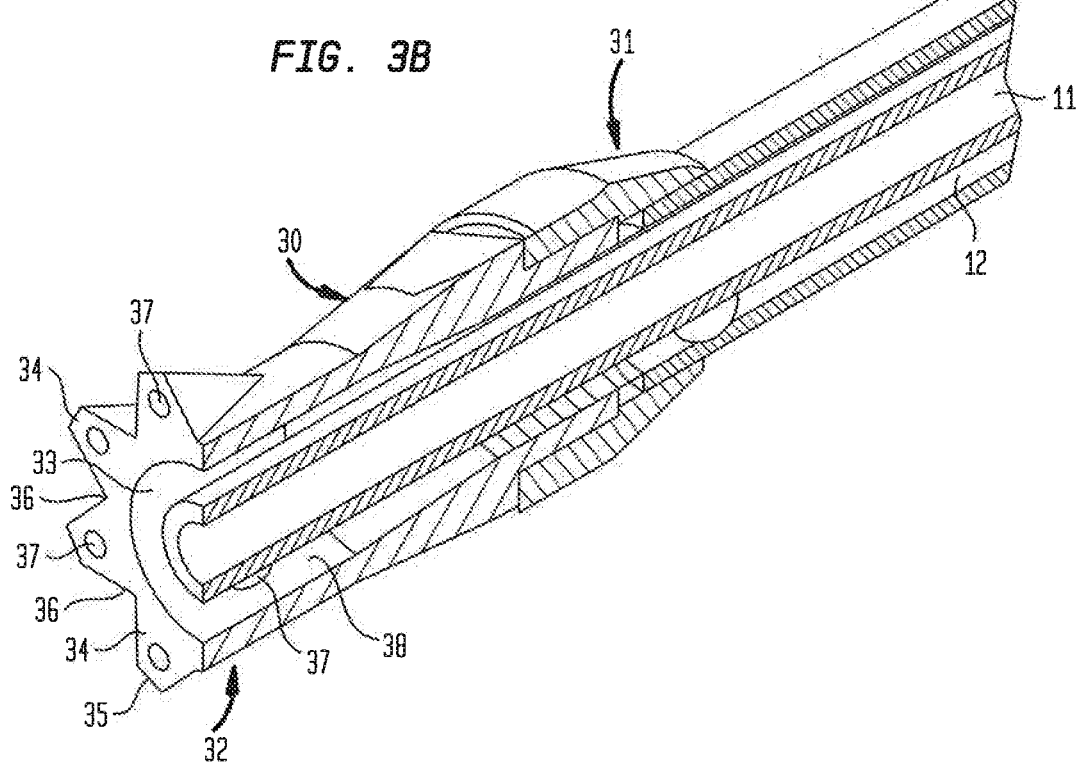
FIG. 3B is a cross-sectional view in perspective of an illustrative embodiment of the discharge end of the burner with the flame nozzle shown in FIG. 3A.

FIG. 2 shows an illustrative embodiment of a burner block 20 of high temperature resistance refractory material. Burner block 20 includes first 21 and second 22 end faces. Burner block 20 includes outer or exterior surface 23 and inner or interior surfaces 24. Burner block 20 is configured with an internal passage 25 for insertion of the central burner member 10a and additional internal passages 26,27,28,29 (26-29) for insertion of the additional oxidant injectors 16.

FIGS. 3A-3D show an illustrative embodiment of the flame nozzle 30 of the burner. The flame nozzle 30 includes a body having an inlet end 31, an outlet end 32 and an internal passage 33 extending between the inlet 31 and outlet 32 ends. Flame nozzle 30 includes a plurality of corrugations 34 having alternating peaks 35 and valleys 36 positioned about the periphery of the outlet end 32 of the nozzle 30. Referring also to FIG. 1, the flame nozzle 30 includes openings 37 positioned near the outlet end 32 of the nozzle body. Each of the openings 37 pass through a wall 38 of the nozzle body 30 and through a corrugation 34 to communicate between the interior 33 of the nozzle and the exterior environment at the outlet end 32 of the nozzle. The circumference created by the peaks 35 of the plurality of corrugations 34 is greater than the circumference of the flame nozzle 30.

Figure 4:
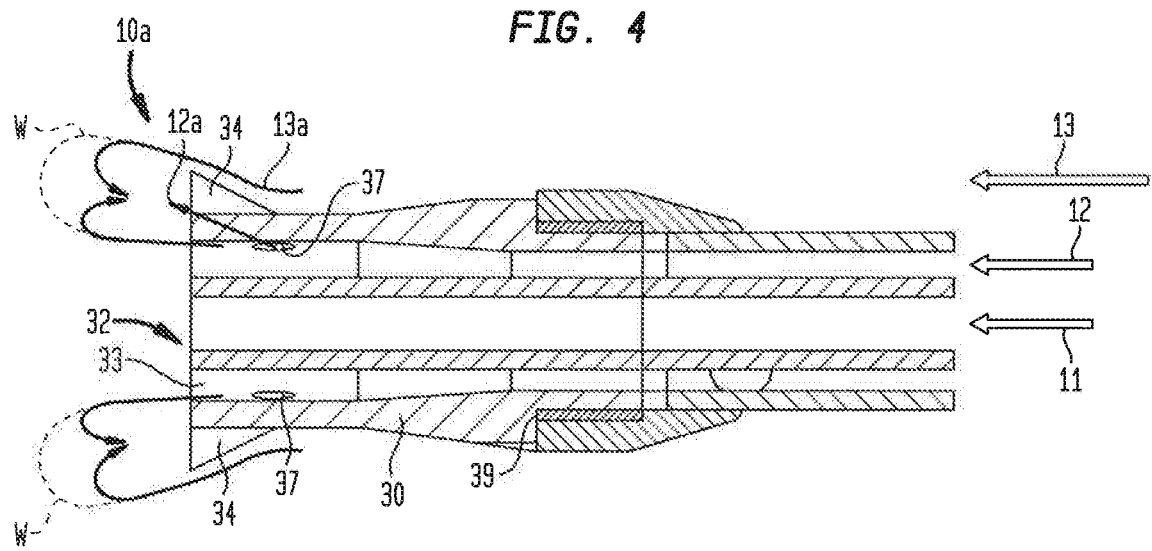
FIG. 4 is a cross-sectional view of the discharge end of an illustrative embodiment of the burner.

FIG. 4 shows the discharge end of the burner 10a. The burner 10a includes a central oxidant feed passage 11, a fuel feed passage 12, such as a natural gas feed passage, surrounding the oxidant feed passage 11 to form an annular fuel flow path around the outer surface of oxidant feed passage 11, and an air flow annulus 13 surrounding the outer surface of the fuel feed passage 12. The discharge end of the burner 10a includes a flame nozzle 30. Flame nozzle 30 is threaded onto the fuel feed passage 12 with internal threads 39. Alternatively, the flame nozzle 30 may be welded in place at the fuel feed passage 12. As depicted in FIG. 4, a fuel feed stream 12a is moved through fuel feed passage 12 and is discharged from burner 10a through the openings 37 that communicate from the interior 33 through corrugations 34 of flame nozzle 30. Air feed stream 13a flowing within the air flow annulus 13 flows over corrugations 34 of flame nozzle 30 and converges with fuel feed stream 12a at a point that is immediately downstream of the discharge/outlet end 32 of the flame nozzle 30 to create at least one recirculating gas wake region W between the fuel feed stream 12a and the air feed stream 13a. A plurality of the regions W may also be created at each of the corrugations 34 as shown for example in FIG. 4, and at FIG. 3C as well. The regions W may be provided at all of the corrugations 34, not just at the corrugations shown in FIG. 3C. As shown in FIG. 4, the air feed stream 13a and fuel feed discharged from the fuel feed passage 12 are drawn into the gas recirculation back toward the burner to stabilize the combustion reaction in the wake region(s) W of the flame nozzle 30.

Figure 5A:
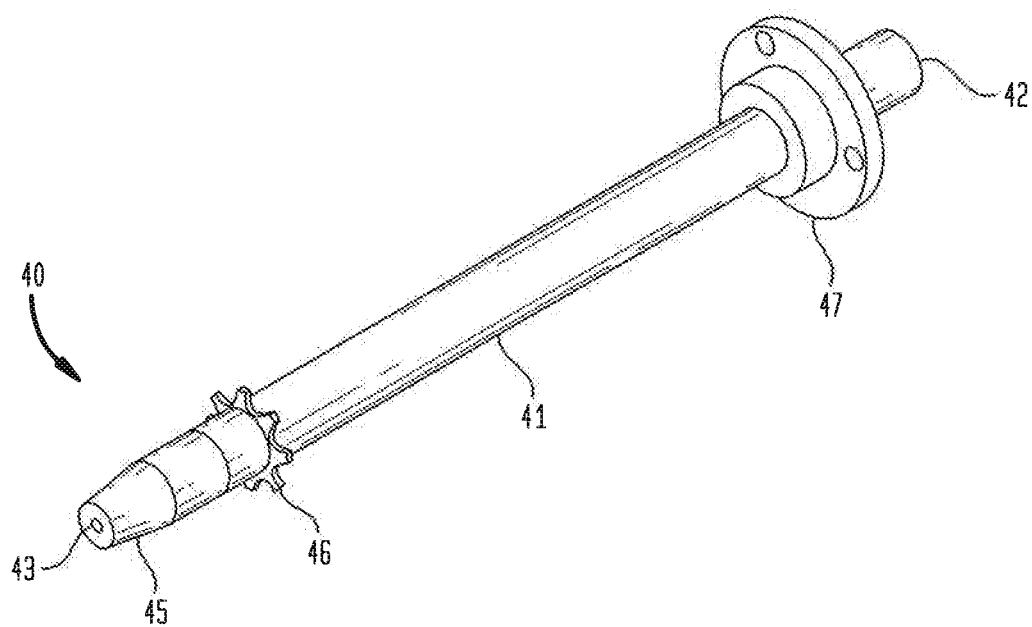
FIG. 5A is a perspective view of an oxidant injector.

Referring to FIGS. 5A and 5B, FIG. 5A is a perspective view of an illustrative oxidant injector 40 having the same structure as the injector 16 of FIG. 1. FIG. 5B is a cross-sectional view of the injector 40 of FIG. 5A. The injector 40 includes an elongated body 41 having opposed oxidant inlet end 42 and oxidant outlet end 43. Oxidant injector 40 further includes a sonic or supersonic oxidant nozzle 44 and annular air flow nozzle 45 formed around an outer surface of the oxidant nozzle 44 and an inner surface of the burner block 20. An annular air flow baffle 46 is positioned coaxially about the periphery of the outer surface of the body 41. As shown in FIGS. 5A and 5B, the annular air flow baffle 46 is positioned downstream from the inlet end 42 and upstream from the nozzles 44, 45. The injector 40 further includes mounting plate 47 coaxially positioned about the body 41 to enable mounting of the injector 40.

FIG. 6 shows an illustrative embodiment of air flow diverter assembly 50. The air flow diverter assembly 50 includes an elongated rod 51 having opposed first end 52 and second end 53. A portion of a length of the elongated rod 51 at or near first end 52 is configured with external threads 54. An air flow diverter 55 is connected at or near the second end 53 of elongated rod 51. In the embodiment shown in FIG. 6, the air flow diverter 55 is configured in a frusto-conical shape having a base portion 56 and tapered side wall portion 57. Frusto-conical air flow diverter 55 includes a central opening 58 passing through the diverter 55. The air flow diverter assembly 50 further includes a rotatable screw 59. Rotatable screw 59 includes internal threads that are threaded over exterior threads 54 of the elongated rod 51. Rotatable screw 59 is in clockwise and counterclockwise rotational engagement with the elongated rod 51. Air flow diverter assembly 50 further includes mounting plate 61 to mount the assembly 50 to a burner housing.

Figure 7A:
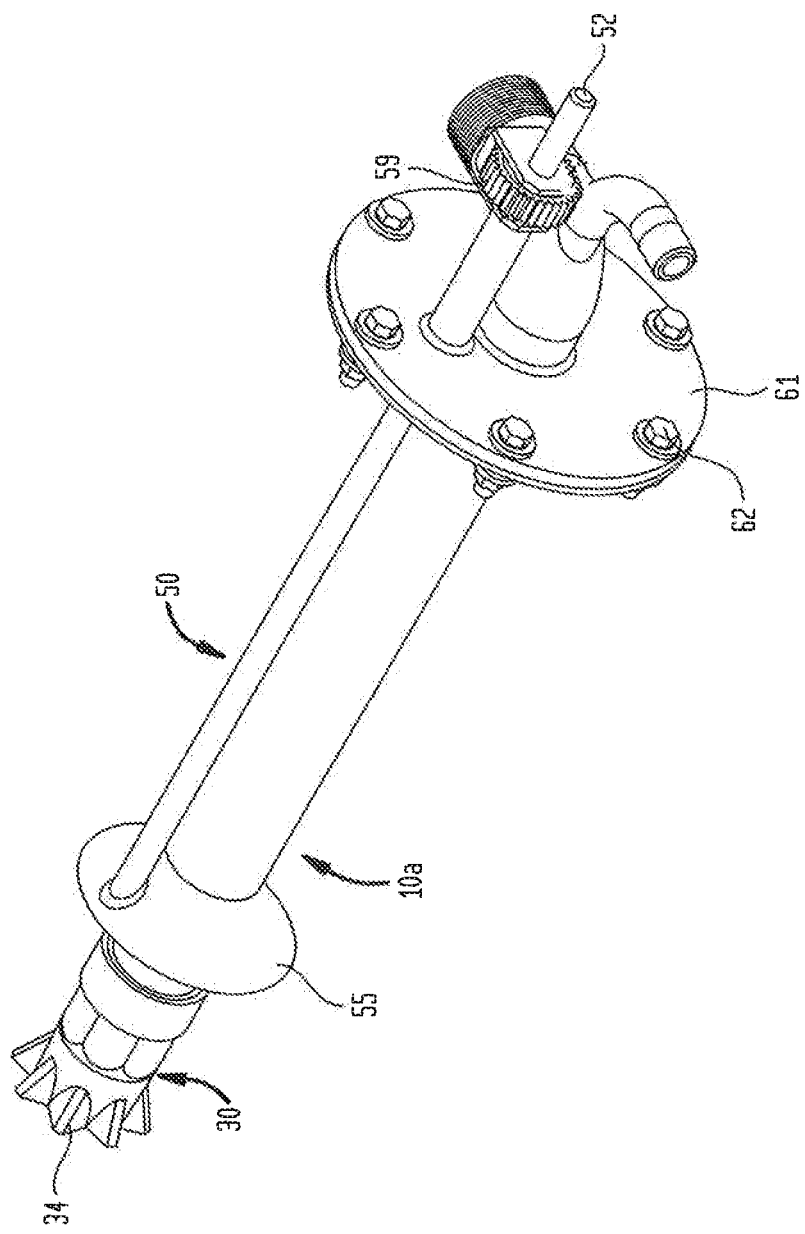
FIG. 7A is a perspective view of an assembly of the burner member with the movable air flow diverter engaged.

Referring to FIGS. 7A and 7B, FIG. 7A shows a perspective view of the central burner 10*a* and the air flow diverter assembly 50 in combination with the flame nozzle 30. FIG. 7B shows a cross-sectional view of FIG. 7A. The burner 10*a* includes oxidant feed passage 11 and fuel feed passage 12 surrounding passage 11. The flame nozzle 30, having a plurality of corrugations 34 and openings communicating from the interior of the nozzle 30 through the corrugations 34, is attached to the discharge/outer ends of passages 11 and 12. The air flow diverter assembly 50 includes the elongated rod 51 having the opposed first 52 and second 53 ends. A portion of the length of the elongated rod 51 at or near the first end 52 is configured with the external threads 54. The air flow diverter 55 is configured in a frusto-conical shape having the base portion 56 and the tapered side wall portion 57, and is connected at or near the second end 53 of the elongated rod 51. The air flow diverter assembly 50 further includes a rotatable screw 59. The rotatable screw 59 includes internal threads that are threaded over the exterior threads 54 of the elongated rod 51. A mounting plate 61 is provided to mount the burner 10 and the air flow diverter assembly 50 to a burner housing. A plurality of elongated threaded bolts 62 extend through openings 63 of the mounting plate 61.

Figure 8A:
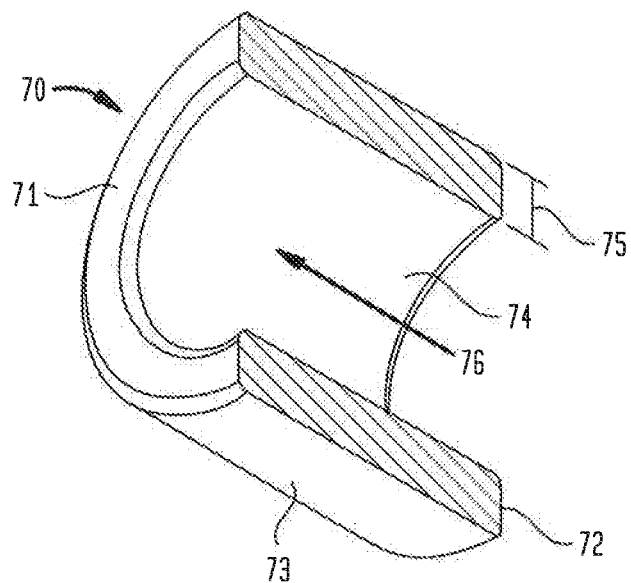
FIG. 8A is a partial perspective view of one embodiment of a refractory sleeve of the burner.

FIG. 8A shows a partial cut-away view of an illustrative embodiment of a refractory baffle 70 or sleeve configured to be disposed about the flame nozzle 30 of burner 10. The baffle 70 is configured in the form of a ring shape and includes opposite facing first 71 and second 72 end faces. The baffle 70 includes outer wall surface 73 and inner wall surface 74, and a wall thickness 75 extending between the outer 73 and inner 74 wall surfaces. The baffle 70 further includes a central opening 76.

Figure 8B:
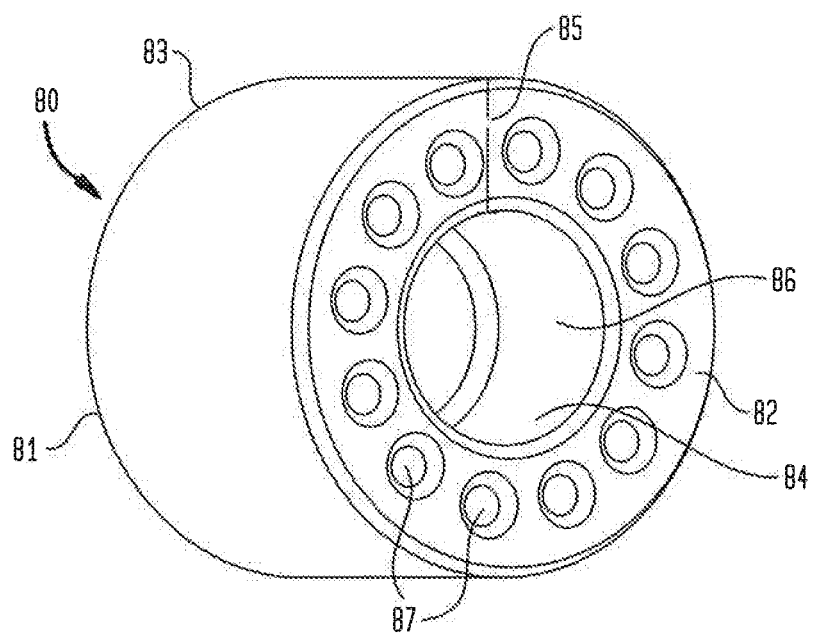
FIG. 8B is a perspective view of another illustrative embodiment of the refractory sleeve of the burner.

FIG. 8B shows a perspective view of another embodiment of a refractory baffle 80. The refractory baffle 80 is configured in the form of a ring shape and includes opposite facing first 81 and second 82 end faces. The baffle 80 includes outer wall surface 83 and inner wall surface 84, and a wall thickness 85 extending between the outer 83 and the inner 84 wall surfaces. The baffle 80 further includes a central opening 86 and a plurality of elongated open air passages 87. Each one of the plurality of the elongated open air passages 87 extends along a longitudinal axis of the baffle 80 from the first face 81 to the second face 82. The elongated air openings 87 are formed in a parallel, side-by-side relationship in a circular shape in the baffle 80.

Figure 9:
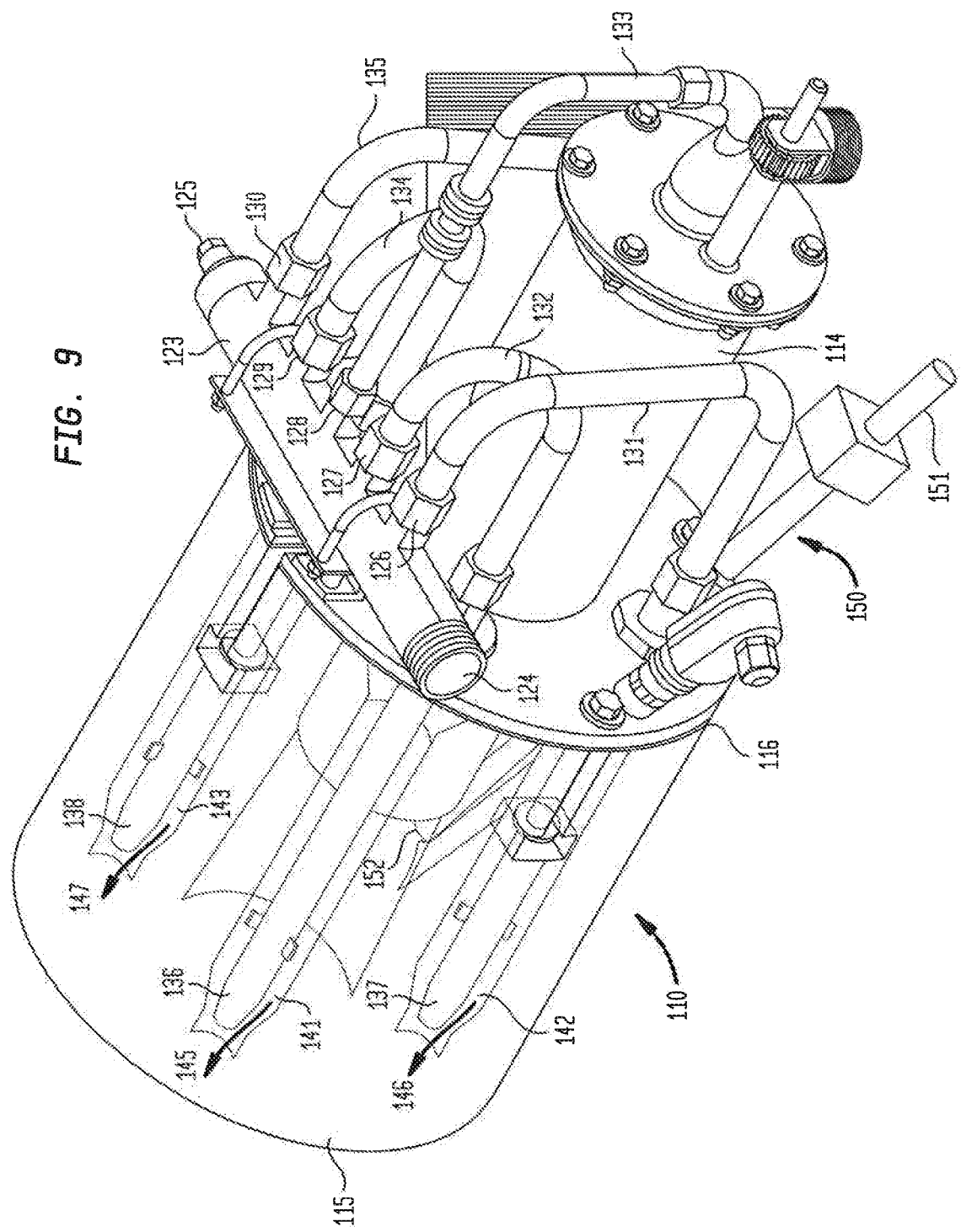
FIG. 9 is a rear perspective view of the burner engaged with a burner block.
Figure 10:
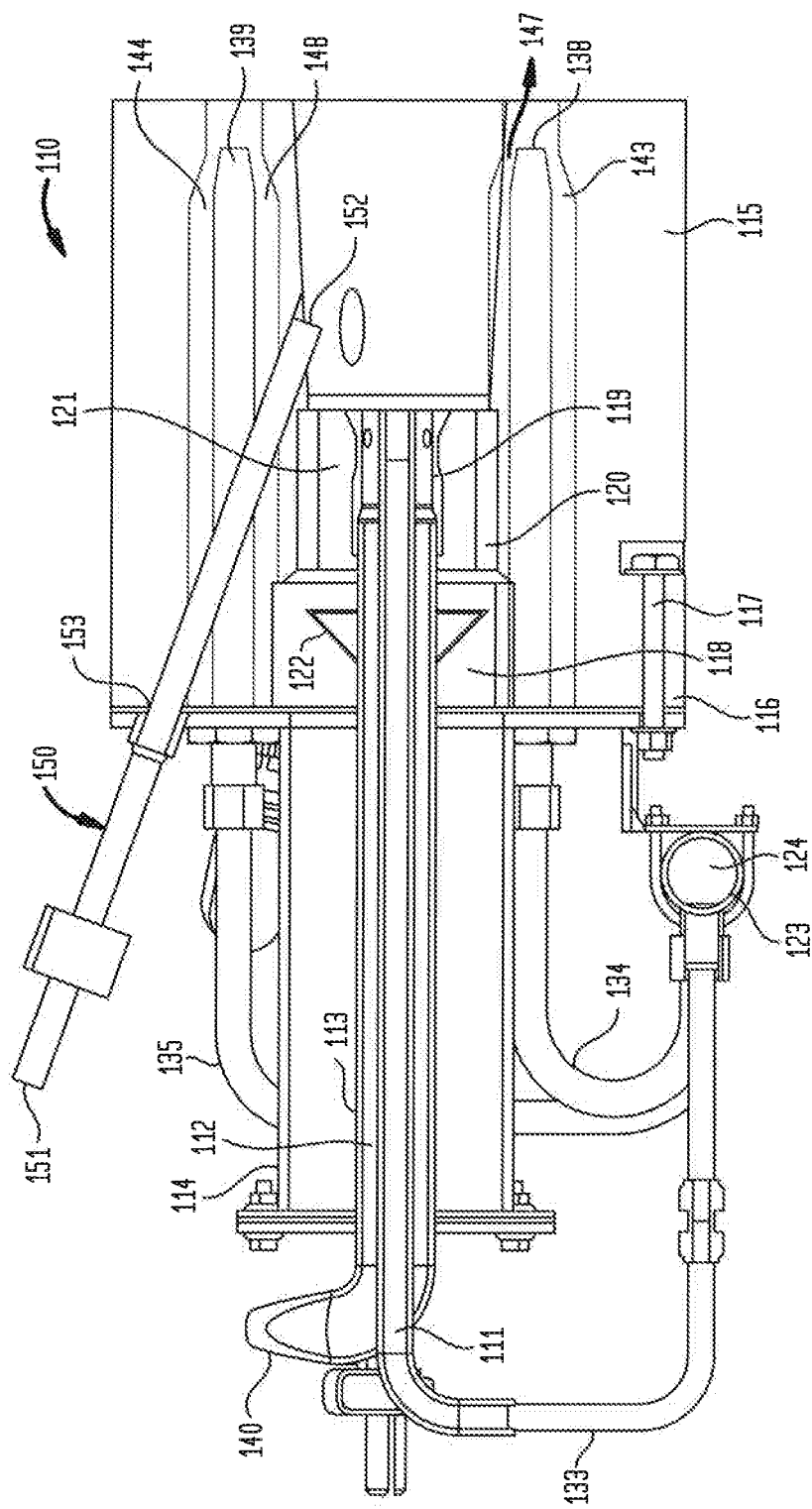
FIG. 10 is side view partially in cross-section of the burner engaged with a burner block.

Referring to FIGS. 9 and 10, FIG. 9 is a rear perspective view of the burner 10 while FIG. 10 is a cross-sectional view of the burner of FIG. 9. The burner 110 includes oxidant feed passage 111, fuel feed passage 112 surrounding the oxidant feed passage, and annular air flow passage 113 surrounding fuel feed 112. Portions of the lengths of the oxidant feed passage 111 and fuel feed passage 112 surrounding oxidant feed passage 111, including the inlet ends of passages 111 and 112, are housed within an elongated cylindrical housing member 114 that is positioned upstream from burner block 115. The housing 114 is attached to the upstream face 116 of burner block 115 through a plurality of elongated mechanical fasteners 116 that are engaged with suitably shaped grooves 117 formed in the burner block 115. Portions of the lengths of the oxidant feed passage 111 and fuel feed passage 112 surrounding oxidant feed passage 111, including the discharge/outlet ends of passages 111 and 112, are positioned within an interior cavity 118 of burner block 115. Flame nozzle 119 is attached or otherwise engaged at the discharge/outlet end of passage 112, and the nozzle 119 is positioned within the interior cavity 118 of burner block 115. A refractory material baffle or sleeve 120 is positioned about the flame nozzle 119 and creates an air annulus 121 between the outer surface of the flame nozzle 119 and the inner surface of sleeve 120. A frusto-conical shaped air flow diverter 122 is coaxially positioned over the outer surface of the passage 112. Frusto-conical diverter 122 is positioned within interior cavity 118 of burner block 115 and upstream from flame nozzle 119.

Oxidant supply manifold 123 is positioned external to the burner block 115. Manifold 123 includes oxidant supply inlet 124 and an optional tapping 125 for connection to a pilot burner or pressure gauge. Manifold 123 further includes a plurality of oxidant outlets 126,127,128,129,130 (126-130) that are in fluid communication with oxidant supply lines 131,132,133,134,135 (131-135) to supply oxidant to oxidant feed passage 111 and peripheral oxidant injectors 136,137,138,139 (136-139) that are positioned about the periphery of the central burner member comprising passages 111 and 112, and air flow annulus 113. Fuel feed supply line 140 is in fluid communication with fuel feed passage 112 to supply the passage 112 with a source of combustible fuel. The peripheral oxidant injectors 136-139 are positioned within elongated cavities 141,142,143,144 (141-144) within the burner block 115. Air flow annuli 145,146,147,148 (145-148) are defined between the outer surface of the peripheral oxidant injectors 136-139 and the inner surfaces of the elongated lance cavities 141-144.

The discharge/outlet end of flame nozzle 119 extends into the interior burner cavity 118 a first distance and terminates at a termination point. Burner block 115 includes a central burner outlet portion that has been configured in a frusto-conical shape with the base of the shape facing outwardly from the burner block 115. The plurality of peripheral oxidant injectors 136-139 extend into the elongated cavities 141-144 a second distance that is beyond the flame nozzle termination point and terminate at lance termination points. An elongated pilot tube 150 having a first end 151 and a second end 152 is inserted through opening 153 in the burner block 115 with the end 152 positioned downstream from the outlet end of the flame nozzle 119.

Illustrative embodiments of the present disclosure include:

In a first embodiment, provided is a burner comprising an oxidant feed passage; a fuel feed passage surrounding the oxidant feed passage; an air feed surrounding the fuel feed passage; and a movable air flow diverter positionable in the air feed along at least a portion of the fuel feed passage, and including a side wall constructed to proportion distribution of the air feed.

According to a second embodiment, provided is a burner of embodiment 1, wherein the oxidant feed comprises an oxidant selected from at least one of air, oxygen-enriched air, non-pure oxygen, and industrially pure oxygen.

According to third embodiment, provided is a burner of either embodiment 1 or embodiment 2, wherein the fuel feed comprises a gaseous fuel selected from at least one of methane, natural gas, liquefied natural gas, propane, liquefied propane gas, butane, low BTU gases, town gas, producer gas, hydrogen, carbon monoxide, and mixtures thereof.

According to fourth embodiment, provided is a burner of either embodiment 1 or embodiment 2, wherein the fuel feed comprises an atomized liquid fuel selected from at least one of heavy fuel oil, medium fuel oil, light fuel oil, kerosene, diesel, and mixtures thereof.

According to fifth embodiment, provided is a burner of either embodiment 1 or embodiment 2, wherein the fuel feed comprises a particulate solid fuel selected from at least one of coal, coke, petroleum coke, rubber, woodchips, sawdust, straw, biomass fuels, and mixtures thereof suspended in a carrier gas stream.

According to sixth embodiment, provided is a burner the fifth embodiment, wherein the carrier gas stream is selected from at least one of air, nitrogen, carbon dioxide, and a gaseous fuel; the gaseous fuel selected from at least one of methane, natural gas, liquefied natural gas, propane, liquefied propane gas, butane, low BTU gases, town gas, producer gas, hydrogen, carbon monoxide, and mixtures thereof.

According to a seventh embodiment, provided is a burner of any of the preceding embodiments, wherein the air feed is contained with an air annulus at least partially surrounding the fuel feed passage.

According to an eighth embodiment, provided is a burner of any of the preceding embodiments, wherein the air flow diverter is reciprocally movable along a portion of the longitudinal axis of the fuel feed passage.

According to a ninth embodiment, provided is a burner of any of the preceding embodiments, wherein the movable air flow diverter is selected from cone shapes and plates having a cross sectional shape selected from the group consisting of a circle, diamond, elliptical, hexagon, octagon, oblong, oval, pentagon, rectangular and square.

According to a tenth embodiment, provided is a burner of any of the preceding embodiments, wherein the movable air flow diverter comprises a cone shape.

According to an eleventh embodiment, provided is a burner of any of the preceding embodiments, wherein the cone shape is a frusto-conical shape.

According to a twelfth embodiment, provided is a burner of any of the preceding embodiments, wherein the burner further comprises a flame nozzle configured to create a gas recirculation region downstream from the flame nozzle between the fuel feed passage and the air feed.

According to a thirteenth embodiment, provided is a burner of any of the preceding embodiments, the flame nozzle includes a gas inlet end, a gas outlet or discharge end, and an interior passage extending between the gas inlet and gas outlet, wherein the gas outlet end of the flame nozzle comprises means for diverting gas and the surrounding air flow.

According to a fourteenth embodiment, provided is a burner of any of the preceding embodiments, wherein the means for diverting gas flow comprises a plurality of adjacent corrugations positioned about the periphery of the outlet end of the flame nozzle.

According to a fifteenth embodiment, provided is a burner of any of the preceding embodiments, wherein the flame nozzle has a plurality of openings, each of the openings passing from the interior passage of the flame nozzle through one of the corrugations.

According to a sixteenth embodiment, provided is a burner of any of the preceding embodiments, wherein the burner further comprises a plurality of oxidant feed lances surrounding the burner.

According to a seventeenth embodiment, provided is a burner of any of the preceding embodiments, further comprising a manifold configured to deliver air, oxygen-enriched air, non-pure oxygen, and industrially pure oxygen to the oxidant feed passage and the oxidant feed lances.

According to an eighteenth embodiment, provided is a furnace having an interior, and the burner of any one of the preceding embodiments engaged with a wall of the housing and in fluid communication with the interior of the housing.

According to a nineteenth embodiment, provided is a method of generating a flame by the combustion of a fuel, the method comprising moving an oxidant feed through an oxidant feed passage; moving a fuel feed through a fuel feed passage surrounding the oxidant feed passage; moving an air feed containing oxidant within an air feed region surrounding the fuel feed passage along the fuel feed passage; creating a gas recirculation region immediately downstream from the air feed and the fuel feed passage; diverting the air feed for proportioning the air feed around the fuel feed passage for controlling flame stabilization in the gas recirculation region; and igniting a resulting gas mixture.

According to a twentieth embodiment, provided is a method of moving the fuel feed through the fuel feed passage and which further comprises moving the fuel feed through a flame nozzle to create the gas recirculation region immediately downstream of the flame nozzle between the fuel feed passage and the air feed.

According to a twenty-first embodiment, provided is a method of generating a flame for drawing the fuel and air in the gas recirculation region back toward the burner.

According to a twenty-second embodiment, provided is a method of generating a flame wherein the diverting the air feed further comprises allocating a proportion of the air feed to at lease one peripheral oxidant feed lance.

According to a twenty-third embodiment, provided is a method of generating a flame by the combustion of a fuel using the burner of any one of the first to eighteenth embodiments above.

According to a twenty-fourth embodiment, provided is the use of the burner of any one of the first to the eighteenth embodiments above to generate a flame by combustion of a fuel.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A burner, comprising:
    an oxidant feed passage (11) for providing an oxidant feed;
    a fuel feed passage (12) surrounding the oxidant feed passage and for providing a fuel feed stream (12*a*);
    an air flow annulus (13) surrounding the fuel feed passage and for providing an air feed stream (13*a*), the air feed stream which converges with the fuel feed stream (12*a*)

downstream of the burner being contained with the air flow annulus at least partially surrounding the fuel feed passage;

a plurality of oxidant injectors (16) positioned about the burner each one of the plurality of oxidant injectors being surrounded by another air flow annulus (18); and a movable air flow diverter (55) positionable in the air feed stream along at least an outer surface portion of the fuel feed passage, the movable air flow diverter being (i) reciprocally positionable along a portion of a longitudinal axis of the fuel feed passage and including a side wall constructed to proportion distribution of the air feed stream, and (ii) adapted to divert and distribute a portion of the air feed steam (13a) from the air flow annulus (13) to the another air flow annulus (18) to thereby surround each of the plurality of oxident injectors (16).

2. The burner of claim 1, wherein the oxidant feed comprises an oxidant selected from the group consisting of at least one of air, oxygen-enriched air, non-pure oxygen, and industrially pure oxygen.

3. The burner of claim 1, wherein the fuel feed stream comprises a gaseous fuel selected from the group consisting of at least one of methane, natural gas, liquefied natural gas, propane, liquefied propane gas, butane, low BTU gases, town gas, producer gas, hydrogen, carbon monoxide, and mixtures thereof.

4. The burner of claim 1, wherein the fuel feed stream comprises an atomized liquid fuel selected from the group consisting of at least one of heavy fuel oil, medium fuel oil, light fuel oil, kerosene, diesel, and mixtures thereof.

5. The burner of claim 1, wherein the fuel feed stream comprises a particulate solid fuel selected from the group consisting of at least one of coal, coke, petroleum coke, rubber, woodchips, sawdust, straw, biomass fuels, and mixtures thereof suspended in a carrier gas stream.

6. The burner of claim 5, wherein the carrier gas stream is selected from a gaseous substance selected from the group consisting of at least one of air, nitrogen, carbon dioxide, and a gaseous fuel; the gaseous fuel selected from the group consisting of at least one of methane, natural gas, liquefied natural gas, propane, liquefied propane gas, butane, low BTU gases, town gas, producer gas hydrogen, carbon monoxide, and mixtures thereof.

7. The burner of claim 1, wherein the movable air flow diverter is selected from cone shapes and plates having a cross sectional shape selected from the group consisting of a circle, diamond, elliptical, hexagon, octagon, oblong, oval, pentagon, rectangular and square.

8. The burner of claim 7, wherein the movable air flow diverter comprises a cone shape.

9. The burner of claim 8, wherein the cone shape comprises a frusto- conical shape.

10. The burner of claim 1, further comprising a flame nozzle configured to provide a gas recirculation region adjacent a downstream end of the flame nozzle between the fuel feed passage and the air flow annulus.

11. The burner of claim 10, wherein the flame nozzle includes a gas inlet end, a gas outlet end, and an interior passage extending between the gas inlet end and the gas outlet end, wherein the gas outlet end of the flame nozzle comprises a plurality of adjacent corrugations (34) positioned about a periphery of the gas outlet end of the flame nozzle for diverting the fuel feed stream and the air feed stream.

12. The burner of claim 11, wherein the flame nozzle comprises a plurality of openings, each one of the plurality of openings passing from the interior passage of the flame nozzle through a corresponding one of the plurality of adjacent corrugations.

13. The burner of claim 1, further comprising a manifold configured to deliver air, oxygen-enriched air, non-pure oxygen, and industrially pure oxygen to the oxidant feed passage and the plurality of oxidant injectors.

* * * * *